(12) United States Patent
Dankberg et al.

(10) Patent No.: US 7,904,020 B2
(45) Date of Patent: Mar. 8, 2011

(54) DOWNSTREAM BROAD BEAM DIVERSITY WITH INTERFERENCE CANCELLATION

(75) Inventors: Mark D. Dankberg, Encinitas, CA (US); Charles N. Pateros, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 736 days.

(21) Appl. No.: 11/843,096

(22) Filed: Aug. 22, 2007

(65) Prior Publication Data

US 2008/0143589 A1 Jun. 19, 2008

Related U.S. Application Data

(60) Provisional application No. 60/823,126, filed on Aug. 22, 2006, provisional application No. 60/823,127, filed on Aug. 22, 2006, provisional application No. 60/823,128, filed on Aug. 22, 2006, provisional application No. 60/823,131, filed on Aug. 22, 2006.

(51) Int. Cl.
*H04B 7/185* (2006.01)
*H04B 1/38* (2006.01)
*H04W 4/00* (2009.01)

(52) U.S. Cl. ........ 455/12.1; 455/13.1; 455/427; 455/570

(58) Field of Classification Search ................. 455/12.1, 455/13.1, 427, 428, 429, 430, 12.11, 421
See application file for complete search history.

(56) References Cited

U.S. PATENT DOCUMENTS

| | | | | |
|---|---|---|---|---|
| 5,446,756 | A * | 8/1995 | Mallinckrodt | 375/130 |
| 5,828,947 | A | 10/1998 | Michel et al. | |
| 5,832,379 | A * | 11/1998 | Mallinckrodt | 455/427 |
| 5,940,753 | A * | 8/1999 | Mallinckrodt | 455/422.1 |
| 5,949,766 | A * | 9/1999 | Ibanez-Meier et al. | 370/316 |
| 5,995,832 | A * | 11/1999 | Mallinckrodt | 455/427 |
| 6,515,980 | B1 * | 2/2003 | Bottomley | 370/342 |
| 6,683,924 | B1 * | 1/2004 | Ottosson et al. | 375/343 |
| 6,859,652 | B2 | 2/2005 | Karabinis et al. | |
| 6,956,814 | B1 | 10/2005 | Campanella | |
| 7,206,364 | B2 * | 4/2007 | Miller | 375/341 |
| 7,269,235 | B2 * | 9/2007 | Miller | 375/340 |
| 2002/0027957 | A1 | 3/2002 | Paulraj et al. | |
| 2002/0050008 | A1 | 5/2002 | Sloderbeck | |
| 2002/0061730 | A1 * | 5/2002 | Hart et al. | 455/12.1 |
| 2002/0132579 | A1 * | 9/2002 | Hart et al. | 455/12.1 |
| 2002/0136191 | A1 | 9/2002 | Draim et al. | |

(Continued)

OTHER PUBLICATIONS

Notice of Allowance for U.S. Appl. No. 11/843,429 mailed on Dec. 29, 2010; 12 pages.

*Primary Examiner* — Tilahun Gesesse
(74) *Attorney, Agent, or Firm* — Kilpatrick Townsend & Stockton LLP

(57) ABSTRACT

Downstream satellite communication systems and methods are disclosed according to embodiments of the invention. According to embodiments of the invention, a composite signal may be received by a subscriber terminal that includes at least a first signal that is transmitted from a first user through a first satellite, a second signal that is transmitted from the first user through a second satellite, and a third signal that is transmitted from a second user through the second satellite. The first signal and the second signal are transmitted to the first and second satellites as the same signal from a gateway, transmitter or subscriber terminal. The third signal is isolated from the composite signal and the subtracted from the composite signal.

21 Claims, 6 Drawing Sheets

U.S. PATENT DOCUMENTS

| | | |
|---|---|---|
| 2003/0050008 A1 | 3/2003 | Patterson et al. |
| 2004/0095907 A1 | 5/2004 | Agee et al. |
| 2005/0227618 A1 | 10/2005 | Karabinis et al. |
| 2006/0126750 A1 | 6/2006 | Friedman |
| 2008/0144596 A1 | 6/2008 | Dankberg et al. |
| 2008/0144734 A1 | 6/2008 | Dankberg et al. |
| 2008/0214107 A1 | 9/2008 | Dankberg et al. |
| 2008/0304555 A1 | 12/2008 | Larsson |
| 2010/0061293 A1 | 3/2010 | Schiff |

* cited by examiner

DOWNSTREAM BROAD BEAM DIVERSITY WITH INTERFERENCE CANCELLATION

CROSS-REFERENCES TO RELATED APPLICATIONS

This application is a non-provisional, and claims the benefit, of commonly assigned U.S. Provisional Application No. 60/823,126, filed Aug. 22, 2006, entitled "Feeder Link Polarization Diversity," the entirety of which is herein incorporated by reference for all purposes.

This application is a non-provisional, and claims the benefit, of commonly assigned U.S. Provisional Application No. 60/823,127, filed Aug. 22, 2006, entitled "Downstream Broad Beam Diversity," the entirety of which is herein incorporated by reference for all purposes.

This application is a non-provisional, and claims the benefit, of commonly assigned U.S. Provisional Application No. 60/823,128, filed Aug. 22, 2006, entitled "Downstream Broad Beam Diversity With Interference Cancellation," the entirety of which is herein incorporated by reference for all purposes.

This application is a non-provisional, and claims the benefit, of commonly assigned U.S. Provisional Application No. 60/823,131, filed Aug. 22, 2006, entitled "Upstream Broad Beam Diversity," the entirety of which is herein incorporated by reference for all purposes.

This application is related to commonly assigned U.S. patent application Ser. No. 11/843,474, filed Aug. 22, 2007, entitled "Cooperative Orthogonal Multi-Satellite Communication System," the entirety of which is herein incorporated by reference for all purposes.

This application is related to commonly assigned U.S. patent application Ser. No. 11/843,089, filed Aug. 22, 2007, entitled "Downstream Broad Beam Diversity," the entirety of which is herein incorporated by reference for all purposes.

This application is related to commonly assigned U.S. patent application Ser. No. 11/843,429, filed Aug. 22, 2007, entitled "Upstream Broad Beam Diversity," the entirety of which is herein incorporated by reference for all purposes.

BACKGROUND OF THE INVENTION

This disclosure relates in general to satellite communication systems and, but not by way of limitation, to satellite communication systems using multiple satellites.

Satellites are power limited. That is, satellites have a limited power resources that can be used for communications, propulsion, processing, steering etc. Increasing the power available to these resources can be very expensive. Thus, satellite systems are often designed with tight power budgets. Therefore, increasing power to a communication link can be very expensive. On the other hand, the performance of a communication link can be proportional to the power associated with the communication link. Thus, a balance is often struck between performance gains and cost when considering designing a satellite communication system.

There is a general need in the art to provide satellite communication links with increased signal strength without greatly increasing the costs of the overall satellite system.

BRIEF SUMMARY OF THE INVENTION

A subscriber terminal for communicating with a gateway through more than one satellite relay is provided according to one embodiment of the invention. The subscriber terminal includes an antenna, an isolator module and an adder module. The antenna is configured to receive a composite signal. This composite signal may include a first signal that is transmitted from a first user through a first satellite, a second signal that is transmitted from the first user through a second satellite, and a third signal that is transmitted from a second user through the second satellite. The first signal and the second signal may be transmitted to the first and second satellites as the same signal from the transmitter, gateway or subscriber terminal. The isolator module may be configured to isolate the third signal from the composite signal, which is then subtracted from the third signal. The composite signal then includes the first and second signals which are the same signal transmitted from the same transmitter. The isolator may include a RAKE receiver or an iterative combiner. The antenna may be a wide beam antenna.

A satellite communication system is provided according to another embodiment of the invention. The satellite communication system includes a gateway with one or more antennas, a plurality of satellites that include at least a first and a second satellite; and a plurality of subscriber terminals in communication with the gateway through the plurality of satellites. The subscriber terminals include an antenna, an isolator module and an adder module. The subscriber terminal may be configured as described above. The plurality of satellites and/or the first and second satellites may be in the same, different, adjacent and/or neighboring orbital slots. The gateway may include 1, 2, 3, 4, 5, 6, 7, 8, 9, 10 or more antennas.

The satellite communication system may also include at least a third satellite. The composite signal received at the subscriber terminal may further include a fourth signal that is transmitted from the gateway through the third satellite and a fifth signal that is transmitted from a second user through the third satellite. The first signal and the fourth signal may be the same signal when transmitted from the gateway. The isolator module may be configured to isolate the fifth signal from the composite signal. The adder module may be configured to subtract the fifth signal from the composite signal.

Another satellite communication method is disclosed according to another embodiment of the invention. The satellite communication method may include receiving a composite signal at a subscriber terminal from at least two satellites. The composite signal may comprise a first primary signal that is transmitted from a first user through a first satellite, a first secondary signal that is transmitted from a second user through the first satellite, a second primary signal that is transmitted from a third user through a second satellite, and a second secondary signal that is transmitted from the second user through the second satellite. The first secondary signal and the second secondary signal may be transmitted to the first and second satellites as the same signal. The method further includes isolating the first and second secondary signals from the composite signals and then subtracting the first secondary and the first and secondary signals may then be subtracted from the composite signal.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 1:
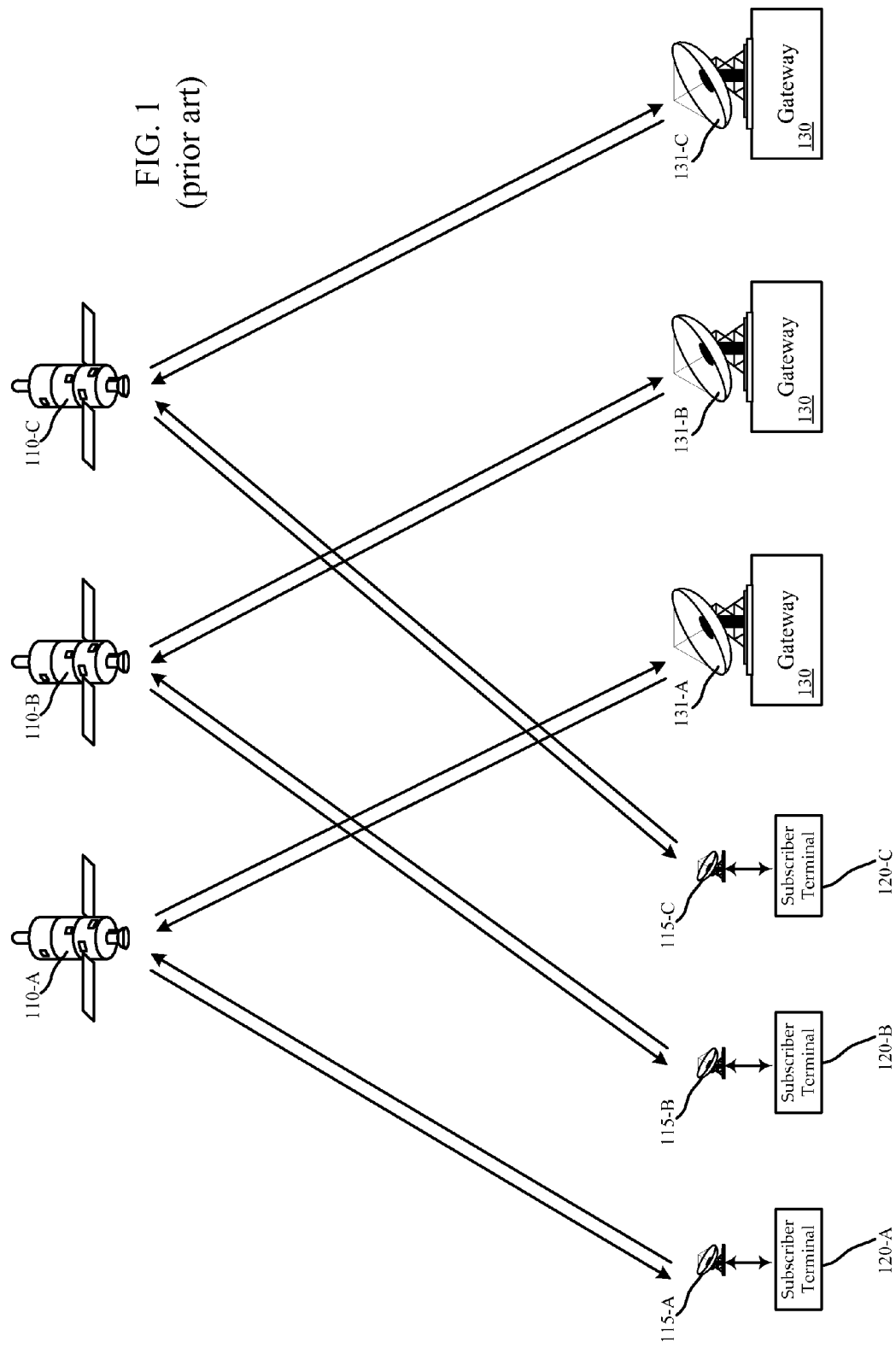
FIG. 1 depicts a common satellite communication system showing multiple subscriber terminals, each of which are in communication with a gateway through an independent satellite.

Embodiments of the present disclosure provide for a satellite communication system that utilizes multiple satellites for communication between, for example, subscriber terminals and a gateway. FIG. 1 depicts a common satellite communication system showing multiple subscriber terminals 120, each of which communicate with a gateway 130 through a satellite 110. As shown, a first subscriber terminal 120-A communicates with a first gateway 130-A through a first link established through a first satellite 110-A. Also shown is a second subscriber terminal 120-B that communicates with a second gateway 130-B through a second link established through a second satellite 110-B. A third subscriber terminal 120-C communicates with a third gateway 130-C through a third link established through a third satellite 110-C. Thus, each of the three subscriber terminals 120 independently communicates with a gateway 130 through one of the three satellites 110. In practice, each gateway would service a number of terminals, which are not shown for clarity.

Each of the antennas 115 at the three subscriber terminals 120 and/or each of the antennas 131 of the gateways 130 are pointed toward a corresponding satellite. For instance the antenna 115-A at the first subscriber terminal 120-A is pointed at the first satellite 110-A, and so on. The operators of the gateways 130 and/or the subscriber terminals 120 may lease or purchase communication access through the corresponding satellite 110. This leased access may provide the operators the necessary coding and/or encryption schemes in order to communicate through the satellite link. The three satellites may be within the same orbital slot, in adjacent orbital slots, or in neighboring orbital slots.

Signals received at the gateway antenna 131-B from the first satellite 110-A and the third satellite 110-C may be considered interference by the second gateway antenna 131-B. Similarly, signals received at the first gateway antenna 131-A from the second satellite 110-B and the third satellite 110-C may be considered interference by the first gateway antenna 131-A. Signals received at the third gateway antenna 131-C from the second satellite 110-B and the first satellite 110-A may be considered interference by the third gateway antenna 131-C.

Despite each subscriber terminal being pointed at a primary satellite, off axis signals may be received from a secondary satellite. For example, from the point of view of the first subscriber terminal 120-A the first satellite 110-A is the primary satellite. The first subscriber terminal 120-A may be pointed toward the first satellite 110-A. Moreover, the first subscriber terminal 110-A may lease or purchase access to communications with the first satellite 110-A or be provided access to the communications with the first satellite 110-A. The second satellite 110-B and the third satellite 120-C may be considered secondary satellites to the first subscriber terminal 110-A. The first gateway antenna 131-A may be pointed toward the first satellite 110-A and may consider the first satellite 110-A the primary satellite and the second and third satellites 110-B, 110-C secondary satellites.

One embodiment of the invention provides for a subscriber terminal that receives a composite signal that includes signals from a first and second satellite. A first signal may be a primary signal received from a first satellite. A second signal may include a primary signal and a version of the first signal both received from a second satellite. The subscriber terminal may isolate and subtract the primary signal from the composite signal. Various interference cancellation techniques may be used to isolate and remove the primary signal from the composite signal.

Another embodiment of the invention may include a third satellite. The composite signal may include another primary signal from another user and a version of the first signal from received from the third satellite. The subscriber terminal may isolate and subtract the primary signal received from the third satellite from the composite signal.

Another embodiment of the invention provides for a subscriber terminal that receives a first signal from a first satellite and a second signal from a second satellite. The first signal may include a primary component and a secondary component. The second signal may also include a primary and secondary signal. The first and second secondary signals may be transmitted from the same transmitter, gateway or user terminal and may originate from the same signal. The secondary signals may be isolated from the composite signal using any of various interference canceling techniques known in the art and subtracted from the composite signal. The gateway and/or subscriber terminals may not have leased access to or been authorized to use the first and/or second satellites.

Figure 2A:
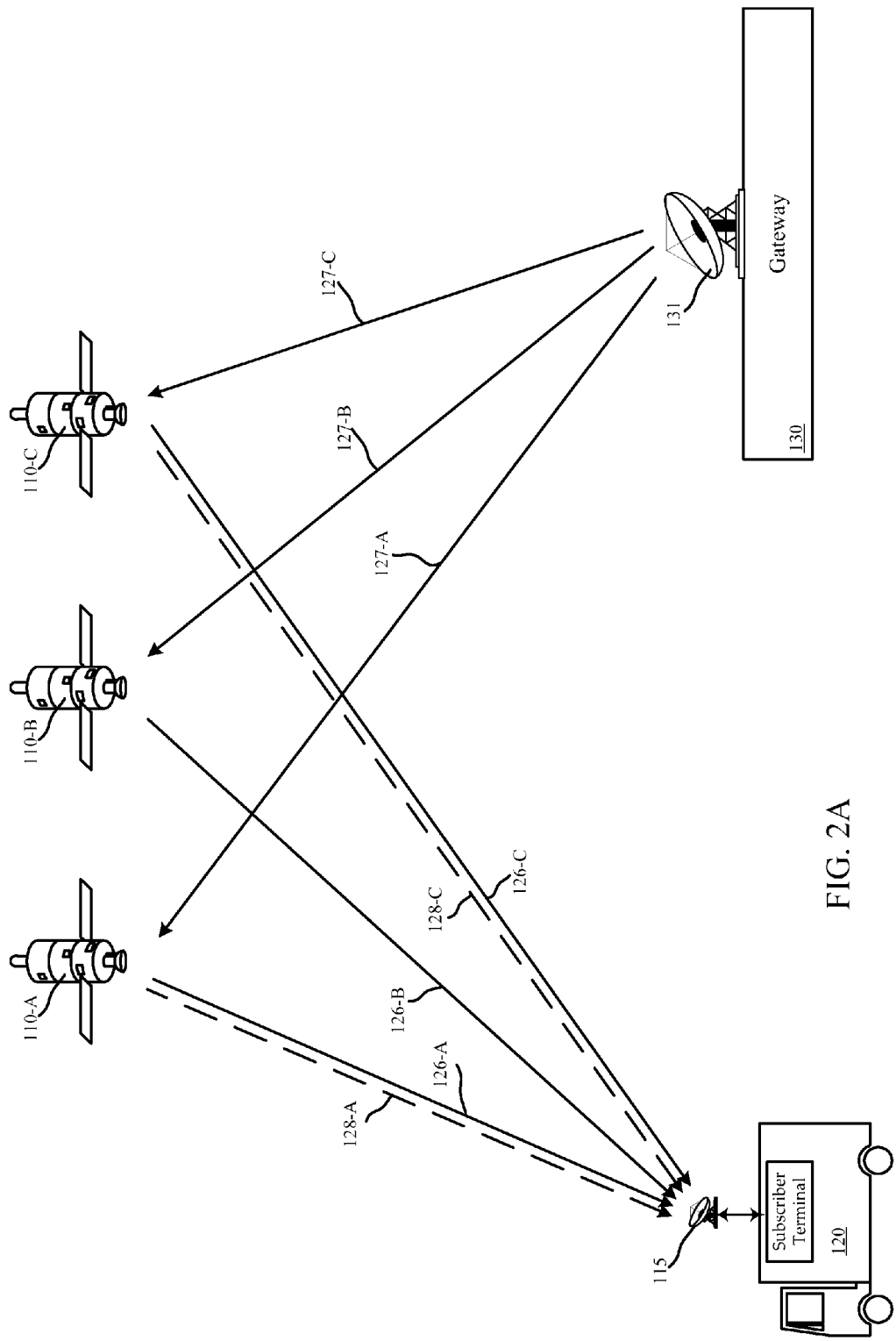
FIG. 2A shows a satellite communication system according to one embodiment of the invention.

FIG. 2A shows a satellite communication system according to one embodiment of the invention. A subscriber terminal 120 includes an antenna 115. In this figure, the subscriber terminal 120 is a mobile subscriber terminal mounted on a truck. In other embodiments the subscriber terminal may be stationary, spaceborne, airborne, and/or seaborne. While not shown in FIG. 2A, more than one subscriber terminal may be included. The subscriber terminal 120 communicates with a gateway 130 using a single gateway antenna 131 through a primary satellite 110-B and two secondary satellites 110-A, 110-C over return service link 126 and return feeder link 127.

The subscriber terminal antenna 115 may include a small aperture antenna 115. The antenna 115 may also be pointable. The antenna may also have a relatively large beam width. For example, the beam width may be 1°, 2°, 3°, 4°, 5°, 6°, 7°, 8°, 9°, 10°, 11° or 12° including fractions thereof. In other embodiments, the beam width may be larger than 12°.

For purposes of this embodiment, the second satellite 110-B is the primary satellite and the other two satellites are secondary satellites 110-A, 110-C. The satellites 110 may be positioned within adjacent orbital slots. Accordingly, the satellites may be separated by at least 2°. In another embodiment, the satellites 110 may be in non-adjacent orbital slots. In yet another embodiment two or more of the satellites 110 may also be within the same orbital slot or in neighboring orbital slots. More than one secondary satellites may also be used. For example, 1, 2, 3, 4, 5, 6, 7, 8, 9 or 10 secondary satellites may be used and may be located in the same, adjacent and/or nonadjacent orbital slots.

The subscriber terminal antenna 115 may be pointed toward the primary satellite 110-B. Similarly, the gateway antenna 13 may also be pointed toward the primary satellite 110-B. The operators of the gateway 130 or the subscriber terminals may lease or be provided access to the primary satellite 110-B. This leased access may provide a satellite transmission relay between the gateway 130 and the subscriber terminal 120. In this embodiment of the invention, however, the gateway 130 may not lease access to the secondary satellites 110-A, 110-C. The subscriber terminal 120 may know the operating parameters of the secondary satellites 110-A, 110-C. For example, the subscriber terminal 120 may know the access and code structures used in communication using satellites 110-A, 110-C. Moreover, the subscriber terminal 120 may know the communication parameters used to modulate and/or encode the signals sent over the secondary satellites 110-A, 110-C. In one embodiment of the invention, the subscriber terminal 120 may not know how to decrypt the data encoded and transmitted through the secondary satellites 110-A, 110-C. In one embodiment, a commercial encoder/decoder may be used to decode signals from the secondary satellites 110-A, 110-C.

The gateway 120 broadcasts a signal 127 to all three satellites 110 using a single antenna 131. While the gateway antenna 131 is pointed toward primary satellite 110-B and transmits a signal 127-B toward the primary satellite 110-B, off axis signals from the antenna 131 may be received at the secondary satellites 110-A, 110-C. Secondary satellites 110-A, 110-C may receive and transmit signals unrelated to the signals from the gateway 126-A, 126-B. For instance, various other users have leased or purchased access to secondary satellites 110-A, 110-C. The operator(s) of the subscriber terminal 120 and the operators of the gateway 130 may not have leased access to the secondary satellites 110-A, 110-C for the purposes of communication between the gateway 130 and the subscriber terminal 120. Despite not leasing or purchasing access to the secondary satellites 110-A, 110-C, off-axis signals 127-A, 127-C from the gateway 130 are received by the secondary satellites 110-A, 110-C and retransmitted to the subscriber terminal 120 through the secondary antennas 131-A, 131-C. It is assumed that a signal will be employed that does not interfere with the primary use of satellites 110-A and 110-C. This can be implemented by deploying spread spectrum signals, and/or lowering the power below that of the primary user, etc.

Secondary satellites 110-A, 110-C receive primary signals from other transmitters that are rebroadcast to the subscriber terminal 120. These signals are the primary signals for the secondary satellites. These signals 128 are retransmitted from the secondary satellites 110-A, 110-C to the subscriber terminal 120 and interfere with the secondary signals 126 rebroadcast the gateway 130. Thus, a composite signal may be received at the subscriber terminal that includes signals from the gateway 130 and various other transmitters.

Other embodiments of the invention may include a system with 2, 4, 5, 6, 7, 8, 9, 10, 11, or more satellites. Accordingly, the subscriber terminal 120 may receive a composite signal with many other signals other than the primary signal transmitted from the gateway 130.

Figure 2B:
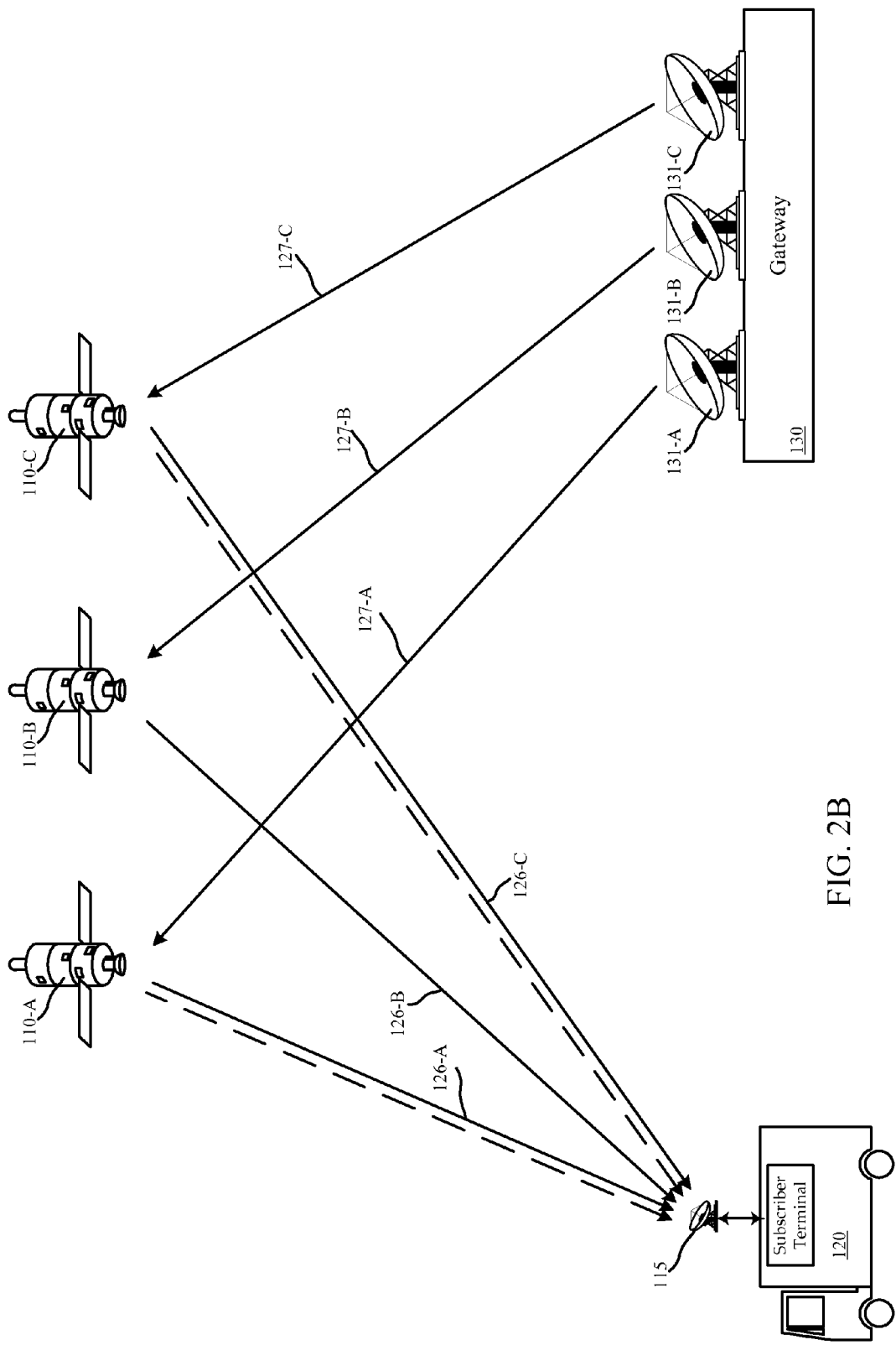
FIG. 2B shows another satellite communication system according to another embodiment of the invention.

FIG. 2B shows another satellite communication system according to another embodiment of the invention. In this embodiment of the invention, the gateway 130 includes three antennas 131 that are each pointed toward one of the three satellites 110 shown in the figure. In this embodiment of the invention, access to the any of the three satellites 110 may be leased or unleased. Moreover, any of the three satellites 110 may also receive signals from other transmitters, gateways or subscriber terminals that are also rebroadcast to the subscriber terminal 120. It is assumed that a signal will be employed that does not interfere with the primary use of satellites 110-A and 110-C. This can be implemented by deploying spread spectrum signals, and/or lowering the power below that of the primary user, etc.

Figure 3:
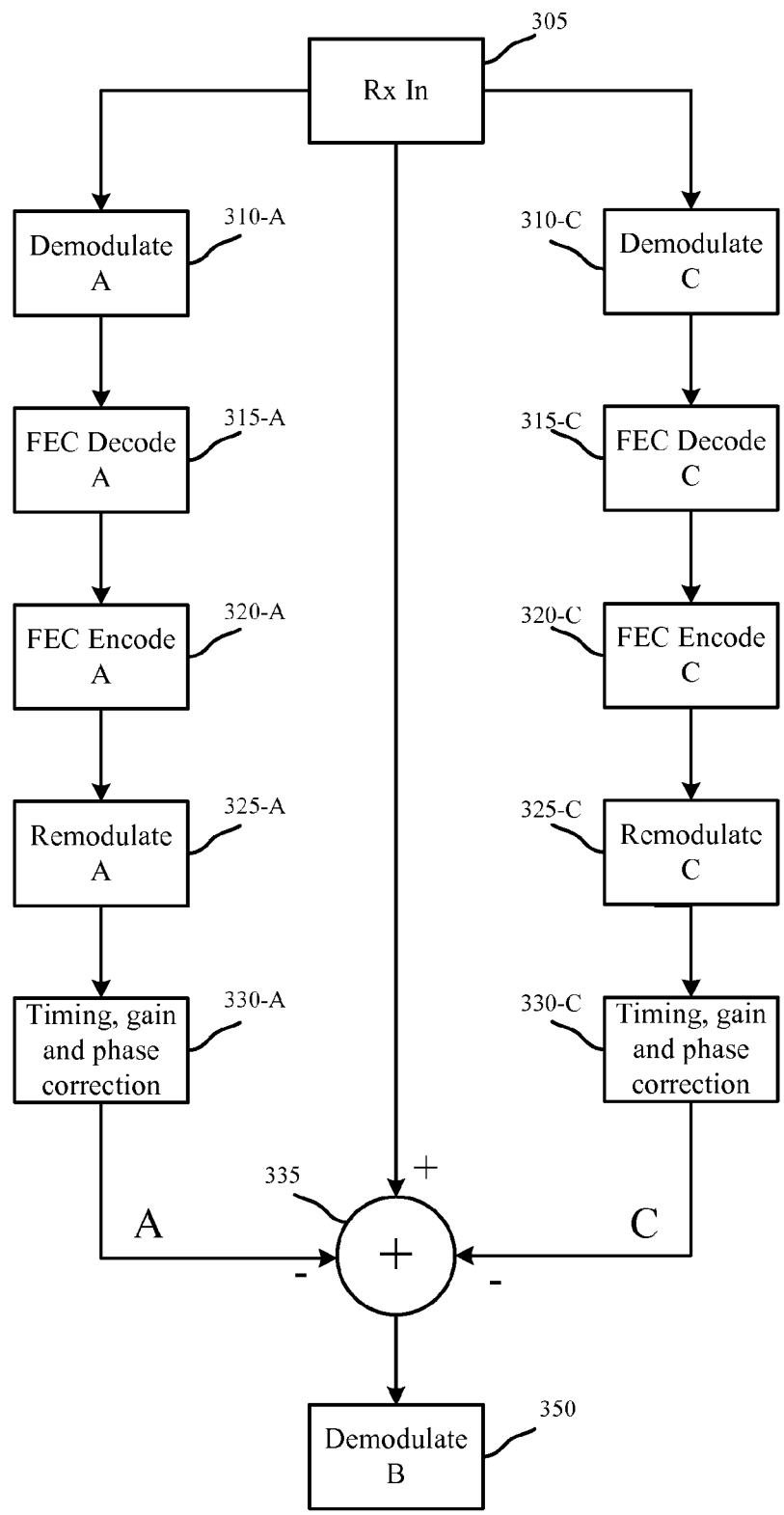
FIG. 3 shows a flowchart of a method for combining three signals (A, B, and C) that are received as a composite signal at a subscriber terminal through multiple satellites according to one embodiment of the invention.

FIG. 3 shows a flowchart of a method for combining three signals (A, B, and C) that are received as a composite signal at the subscriber terminal 120 through the satellites 110 according to one embodiment of the invention. A composite signal is received from the three satellites at block 305. The signal is split into three signals to remove the interfering signals from the composite signal. Two of the signals are individually demodulated at blocks 310 to isolate the secondary signals. The demodulated signals may be FEC decoded at blocks 315 using any type of commonly used FEC decoder such as, but not limited to, convolutional decoder, block decoder or turbo (iterative) decoder. The symbols may then be FEC encoded at blocks 320 and remodulated where it is reshaped into a replica of the primary component of the received waveform at blocks 325. The remod-demod and decode-encode steps isolate the interfering signals A and C from the composite signals received from the three satellites. Those skilled in the art will recognize that there are various other ways to isolate these signals without deviating from spirit and scope of the present invention. For example, various interference removal techniques may be employed.

Once isolated, the timing, phase and/or gain may be corrected at block 330. Interfering signals A and C may then be subtracted from the composite signal received from the satellites at blocks 335. A delay may be added to the signals in order to counteract any path length variations. Once the interfering signals have been subtracted the resulting signal may then be demodulated and decoded at block 350.

The composite signal received at the gateway may be decoded and/or demodulated using a RAKE receiver. The RAKE receiver may include three paths or prongs corresponding to the signals received from the three satellites. Moreover, other interference cancelling techniques are known in the art that may be employed to remove interference signals from the composite signal. For example, iterative combining may be employed.

The embodiment of the invention shown in FIGS. 2A and 2B show a signal subscriber terminal. In other embodiments a plurality of subscriber terminals may be in communication with the gateway through the three relay satellites. Spread spectrum signals may be used to spread the signals across frequency and/or time. Various coding and/or multiplexing schemes may also be employed. For example, the signals may be OFDM, FDM, CDMA, or the like.

Figure 4:
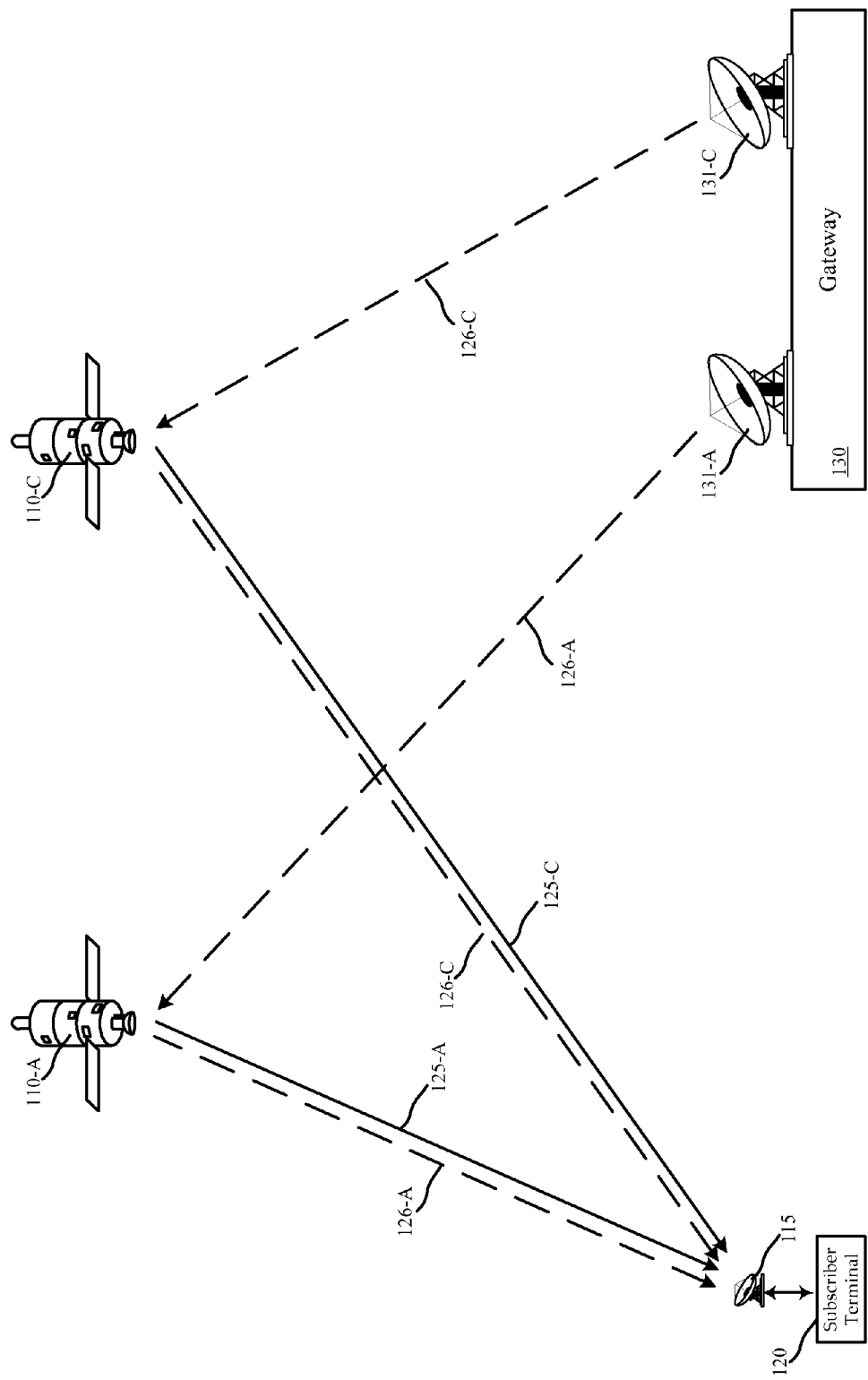
FIG. 4 shows another satellite communication system according to another embodiment of the invention.

FIG. 4 shows another satellite communication system according to another embodiment of the invention. According to this embodiment of the invention, gateway 130 transmits signals 126 to the subscriber terminal 120 through two secondary satellites 110-A, 110-B. According to this embodiment of the invention, the gateway 130 and/or subscriber terminal 120 does not transmit signals to a primary satellite. Both secondary satellites 110-A, 110-C do not provide leased access to the subscriber terminal and/or to the gateway. These signals are then rebroadcast to the subscriber terminal 120 and are received as a composite signal that includes signals 125 that are signals from another gateway, transmitter or subscriber terminal.

Figure 5:
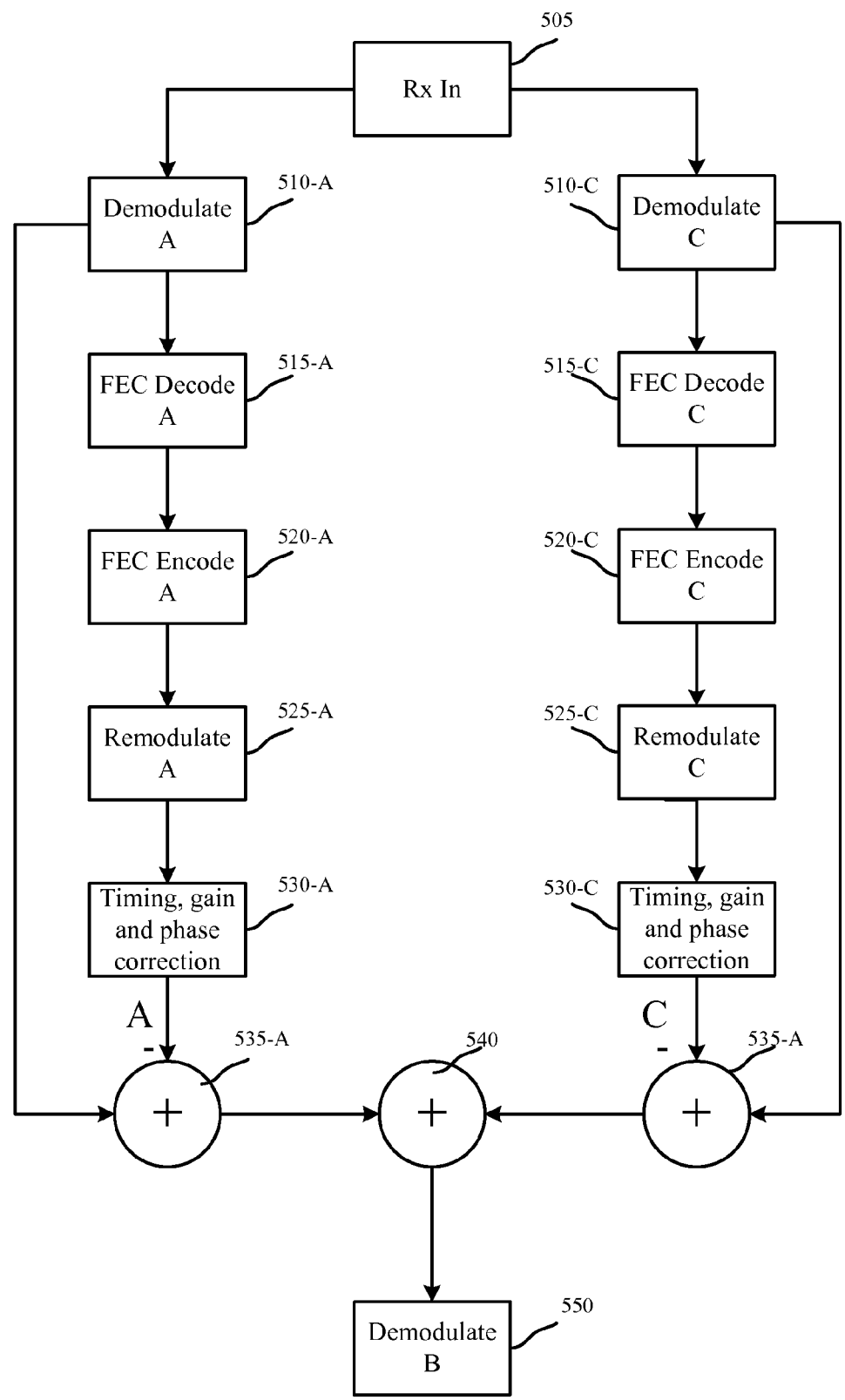
FIG. 5 shows a flow chart for isolating and adding signals received from secondary satellites according to another embodiment of the invention.

FIG. 5 shows a flow chart for isolating and adding the signals received from the secondary satellites 110-A, 110-C shown in FIG. 4 according to another embodiment of the invention. The signals may be received and processed, for example, at a subscriber terminal. Primary signal A is received at the first secondary satellite 110-A and primary signal C is received at the second secondary satellite 110-C. Both secondary satellites also receive signal B as a secondary signal. The goal of the flow chart is to isolate the secondary signals by subtracting out the primary signals and then combining the secondary signals. The composite signal is received at subscriber terminal at block 505. The primary signals, signal A and signal C, are then demodulated at blocks 510 and decoded at blocks 515. The primary signals are then recoded at blocks 520 and remodulated at blocks 525. The primary signals are then subtracted from the received signal at block 535. Once subtracted, the secondary signal, signal B, is left and the signals may be added using maximal ratio combining or any other soft combining in block 540. Signal B may be demodulated at block 550. A delay in one or both channels may be introduced as well. Timing, gain, and/or phase correction may also occur within each channel at blocks 530.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

While the principles of the disclosure have been described above in connection with specific apparatuses and methods, it is to be clearly understood that this description is made only by way of example and not as limitation on the scope of the disclosure.

What is claimed is:

1. A subscriber terminal for communicating with a gateway through more than one satellite relay comprising:
    an antenna configured to receive a composite signal from more than one satellite relay, wherein the composite signal includes a first signal that is transmitted from a first user through a first satellite, a second signal that is transmitted from the first user through a second satellite, and a third signal that is transmitted from a second user through the second satellite, wherein the first signal and the second signal are transmitted to the first and second satellites as the same signal;
    an isolator module configured to:
        isolate each of the first signal and the second signal from the composite signal; and
        combine the first signal and the second signal to generate a received signal having a higher apparent signal strength than that of the first signal alone phase shift at least one of the first or the second signal so that the first signal and the second signal are in phase with respect to each other; and add the first signal and the second signal.

2. The satellite communication system according to claim 1, wherein the isolator module includes a RAKE receiver.

3. The satellite communication system according to claim 1, wherein the isolator module includes an iterative combiner.

4. The satellite communication system according to claim 1, wherein the isolator module is configured to combine the first signal and the second signal to generate the received signal by:
 synchronizing the first signal and the second signal; and
 adding the first signal and the second signal.

5. The satellite communication system according to claim 1, wherein the isolator module is further configured to:
 subtract the third signal from the composite signal.

6. A satellite communication system comprising:
 a gateway including one or more antennas;
 a plurality of satellites, including at least a first and a second satellite; and
 a subscriber terminal in communication with the gateway through the plurality of satellites, wherein the subscriber terminal includes:
  an antenna configured to receive a composite signal from the plurality of satellites, wherein the composite signal includes a first signal that is transmitted from the gateway through the first satellite, a second signal that is transmitted from the gateway through the second satellite, and a third signal that is transmitted from a first user through the second satellite, wherein the first signal and the second signal are the same signal when transmitted from the gateway;
  an isolator module configured to:
   isolate each of the first signal and the second signal from the composite signal; and
   combine the first signal and the second signal to generate a received signal having a higher apparent signal strength than that of the first signal alone phase shift at least one of the first or the second signal so that the first signal and the second signal are in phase with respect to each other; and add the first signal and the second signal.

7. The satellite communication system according to claim 6, wherein the first and second satellites orbit in different orbital slots.

8. The satellite communication system according to claim 6, wherein the first and second satellites orbit in adjacent orbital slots.

9. The satellite communication system according to claim 6, wherein the plurality of satellites comprises three satellites and the gateway comprises three antennas.

10. The satellite communication system according to claim 6, wherein the plurality of satellites comprises three satellites and the gateway comprises one antenna.

11. The satellite communication system according to claim 6, wherein the subscriber terminal antenna comprises a wide beam width antenna.

12. The satellite communication system according to claim 6, wherein the subscriber terminal antenna comprises a 6° beam width.

13. The satellite communication system according to claim 6, wherein the subscriber terminal antenna comprises a 4° beam width.

14. The satellite communication system according to claim 6, wherein:
 the plurality of satellites comprises at least a third satellite; and
 the subscriber terminals further include an antenna further configured to receive a fourth signal that is transmitted from the gateway through the third satellite, and a fifth signal that is transmitted from a second user through the third satellite, wherein the first signal and the fourth signal are the same signal when transmitted from the gateway, the isolator module configured to isolate the fourth signal from the composite signal, and combine the fourth signal with the first signal and the second signal to generate the received signal.

15. The satellite communication system according to claim 6, wherein the isolator module includes a RAKE receiver.

16. The satellite communication system according to claim 6, wherein the isolator module includes an iterative combiner.

17. A satellite communication method comprising:
 receiving a composite signal at a subscriber terminal from a plurality of satellites; wherein the composite signal includes a first signal that is transmitted from a first user through a first satellite, a second signal that is transmitted from the first user through a second satellite, and a third signal that is transmitted from a second user through the second satellite, wherein the first signal and the second signal are transmitted to the first and second satellites as the same signal;
 isolating each of the first signal and the second signal from the composite signal; and
 combining the first signal and the second signal to generate a received signal having a higher apparent signal strength than that of the first signal alone phase shifting at least one of the first or the second signal so that the first signal and the second signal are in phase with respect to each other; and add the first signal and the second signal.

18. The method according to claim 17, wherein the composite signal includes a fourth signal that is transmitted from the first user through a third satellite and a fifth signal that is transmitted from a third user through the third satellite.

19. The method according to claim 18, further comprising isolating the fourth signal from the composite signal and combining the fourth signal with the first signal and the second signal to generate the received signal.

20. A satellite communication method comprising:
 receiving a composite signal at a subscriber terminal from at least two satellites; wherein the composite signal includes a first primary signal that is transmitted from a first user through a first satellite, a first secondary signal that is transmitted from a second user through the first satellite, a second primary signal that is transmitted from a third user through a second satellite, and a second secondary signal that is transmitted from the second user through the second satellite, wherein the first secondary signal and the second secondary signal are transmitted to the first and second satellites as the same signal;
 isolating the first secondary signal from the composite signal;
 isolating the second secondary signal from the composite signal; and
 combining the first secondary signal and the second secondary signal to generate a received signal having a higher apparent signal strength than that of either the first secondary signal or the second secondary signal phase shifting at least one of the first or the second signal so that the first signal and the second signal are in phase with respect to each other; and add the first signal and the second signal.

21. The satellite communication method according to claim 20, wherein the second user does not lease access to either or both of the first satellite or the second satellite.

* * * * *